US007657536B2

(12) United States Patent
Newport

(10) Patent No.: US 7,657,536 B2
(45) Date of Patent: Feb. 2, 2010

(54) APPLICATION OF RESOURCE-DEPENDENT POLICIES TO MANAGED RESOURCES IN A DISTRIBUTED COMPUTING SYSTEM

(75) Inventor: William T. Newport, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 1035 days.

(21) Appl. No.: 11/068,262

(22) Filed: Feb. 28, 2005

(65) Prior Publication Data

US 2006/0195448 A1    Aug. 31, 2006

(51) Int. Cl.
G06F 17/30 (2006.01)
(52) U.S. Cl. .............................. 707/10; 707/9; 709/220; 709/226
(58) Field of Classification Search ................ 707/9–10, 707/201; 709/220, 226
See application file for complete search history.

(56) References Cited

U.S. PATENT DOCUMENTS

| 7,174,379 | B2* | 2/2007 | Agarwal et al. ............. 709/226 |
| 7,240,015 | B1 | 7/2007 | Karmouch et al. |
| 7,398,471 | B1* | 7/2008 | Rambacher et al. ......... 715/744 |
| 7,463,587 | B2 | 12/2008 | Rajsic et al. |
| 2002/0087665 | A1* | 7/2002 | Marshall et al. ............. 709/220 |
| 2003/0018766 | A1 | 1/2003 | Duvvuru |
| 2003/0028642 | A1* | 2/2003 | Agarwal et al. ............. 709/226 |
| 2003/0126190 | A1 | 7/2003 | Wada et al. |
| 2003/0177150 | A1 | 9/2003 | Fung et al. |
| 2003/0187817 | A1 | 10/2003 | Agrawal et al. |
| 2003/0233433 | A1 | 12/2003 | Halpern |
| 2005/0060427 | A1 | 3/2005 | Phillips et al. |
| 2005/0111467 | A1* | 5/2005 | Ng et al. ..................... 370/401 |
| 2005/0149940 | A1* | 7/2005 | Calinescu et al. ........... 718/104 |
| 2006/0294219 | A1 | 12/2006 | Ogawa et al. |
| 2008/0040459 | A1* | 2/2008 | Donatelli et al. ............ 709/220 |

FOREIGN PATENT DOCUMENTS

WO    WO 2004/044677 A2    5/2004

OTHER PUBLICATIONS

"Beyond SelfReliant Basic Availability Management (SR-BAM): Upgrading to SelfReliant Advanced Suite," GoAhead Software Incorporated, www.goahead.com.

* cited by examiner

Primary Examiner—Debbie M Le
(74) Attorney, Agent, or Firm—Wood, Herron & Evans, LLP

(57) ABSTRACT

An apparatus, program product and method enable program code that manages a managed resource, e.g., a high availability manager, to receive status information associated with an externally-managed resource such that the program code can properly apply an activation policy to the managed resource in a manner that is consistent with any requirements placed upon that resource by the externally-managed resource. Where, for example, a managed resource is required to be collocated on the same node or computer as an externally-managed resource, the status information may include location information that identifies where the externally-managed resource is currently active, such that the program code can activate the managed resource on the same node as the externally-managed resource.

20 Claims, 3 Drawing Sheets

APPLICATION OF RESOURCE-DEPENDENT POLICIES TO MANAGED RESOURCES IN A DISTRIBUTED COMPUTING SYSTEM

CROSS-REFERENCE TO RELATED APPLICATIONS

This application is related to U.S. patent application Ser. No. 11/068,338, filed on even date herewith by William T. Newport, and entitled "APPLICATION OF ATTRIBUTE-SET POLICIES TO MANAGED RESOURCES IN A DISTRIBUTED COMPUTING SYSTEM," (hereinafter the "Newport application"), which application is incorporated by reference herein.

FIELD OF THE INVENTION

The invention is generally directed to distributed computing systems, and in particular, to the management of resources in distributed computing systems.

BACKGROUND OF THE INVENTION

Distributed computing systems have found application in a number of different computing environments, particularly those requiring high performance and/or high availability and fault tolerance. In a distributed computing system, multiple computers connected by a network are permitted to communicate and/or share workload. Distributed computing systems support practically all types of computing models, including peer-to-peer and client-server computing.

One particular type of distributed computing system is referred to as a clustered computing system. "Clustering" generally refers to a computer system organization where multiple computers, or nodes, are networked together to cooperatively perform computer tasks. An important aspect of a computer cluster is that all of the nodes in the cluster present a single system image—that is, from the perspective of a client or user, the nodes in a cluster appear collectively as a single computer, or entity. In a client-server computing model, for example, the nodes of a cluster collectively appear as a single server to any clients that attempt to access the cluster.

Clustering is often used in relatively large multi-user computing systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

In many clustered computer systems, the services offered by such systems are implemented as managed resources. Some services, for example, may be singleton services, which are handled at any given time by one particular node, with automatic failover used to move a service to another node whenever the node currently hosting the service encounters a problem. Other services, often referred to as distributed services, enable multiple nodes to provide a service, e.g., to handle requests for a particular type of service from multiple clients.

Resources such as cluster-provided services are typically managed through the use of various types of policies that are necessary for some aspect of a resource's existence. A policy, in general, is any set of rules that may be used to manage the existence and operation of one or more resources, and includes, for example, activation or high availability policies, security policies, rights policies, and other types of management policies. An activation policy may be used, for example, to select a particular node or nodes to use to host a service, and/or to manage how failover occurs in response to a node failure. A security policy may be used, for example, to determine what resources particular users are permitted to access and/or what types of operations those users are permitted to perform. A rights policy may be used, for example, to control access to digital content.

In many distributed computer systems, cluster-provided services may represent but one kind of resource. Furthermore, different types of resources may be dependent upon one another, e.g., requiring one type of resource to be managed in a manner that is consistent with the management of another type of resource.

For example, some application server environments manage any cluster-provided services, e.g., transaction services, messaging services, etc. that run within such environments. In many instances, such application server environments incorporate integrated high availability managers that manage the activation of individual instances of a cluster-provided service on each node. The domain of a high availability manager incorporated into an application server environment, however, is typically constrained to those resources that are provided by the environment itself. Such constraints, however, can complicate the management of resources based upon the requirements of other resources that exist externally from the application server environment.

As one example, a transaction service typically maintains a log of transactions to assist in recovery of failures. The log must be stored in persistent memory such as a SAN disk so the data maintained thereby is not lost as a result of a failure. Management of a log may be provided by a distributed resource such as a Journal File System (JFS), and in many environments, a JFS file system can only be mounted on one node of a distributed computer system at a time. To ensure access to the log, therefore, a transaction service is often required to be active on the same node as, i.e., be collocated with, the JFS file system within which the log is managed.

A separate high availability manager, such as a middleware-based or operating system-based high availability manager, typically manages JFS file systems and other similar resources in a distributed computer system. In conventional designs, however, there is no interaction between the high availability manager of an application server environment and other resource managers, thus precluding one high availability manager from being able to make resource management decisions that are dependent upon the status of resources that are managed outside of that manager's domain.

In the above example, therefore, a conventional high availability manager integrated into an application server environment may be incapable of independently determining where to activate a transaction service, as the manager is typically not aware of upon which node the JFS file system is currently active.

Conventional systems have typically addressed this limitation by requiring an application server to be started on a node using a script under the control of an external high availability manager. The script identifies the location of any resource that may need to be collocated with any resources being managed by the application server environment, such that when the application server initializes, the high availability manager therefor can activate any resources that depend on any externally-managed resources on the proper nodes.

Starting an application server, however, is often time consuming, and may lead to several minutes of downtime before the server can resume activities. Given the goal of continuous accessibility in a distributed computer system, even a few minutes of downtime is highly undesirable.

Therefore, a significant need exists in the art for a faster and more efficient manner of coordinating the management of resources that are dependent upon other, externally-managed resources.

SUMMARY OF THE INVENTION

The invention addresses these and other problems associated with the prior art in providing an apparatus, program product and method that enable program code that manages a managed resource, e.g., a high availability manager, to receive status information associated with an externally-managed resource such that the program code can properly apply an activation policy to the managed resource in a manner that is consistent with any requirements placed upon that resource by the externally-managed resource. For example, where a managed resource is required to be collocated on the same node or computer as an externally-managed resource, the status information may include location information that identifies where the externally-managed resource is currently active, such that the program code can activate the managed resource on the same node as the externally-managed resource.

Therefore, consistent with the invention, an activation policy may be applied to a managed resource in a distributed computer environment by receiving status information associated with an externally-managed resource, where the activation policy is associated with the externally-managed resource and is configured to make activation decisions about the managed resource based upon a status of the externally-managed resource. The status information is then used to apply the activation policy to the managed resource.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments described hereinafter provide status information regarding an externally-managed resource to a high availability manager or other program code that manages a managed resource to enable the high availability manager to properly apply an activation policy to the managed resource in a manner that is consistent with any requirements placed upon the managed resource by the externally-managed resource.

A managed resource, in this context, may be considered in different embodiments to correspond to practically any type of software or hardware entity in a distributed computer system that relies on a policy to manage some aspect of its existence or operation. Likewise, an externally-managed resource refers to a resource that is managed externally, e.g., by a different entity from that which manages the managed resource. For example, where a managed resource is managed in an application server environment, an externally-managed resource may be managed by a different high availability manager incorporated into middleware or into an operating system. Other entities, including administrators, may manage an externally-managed resource consistent with the invention. An activation policy, in this context, may be considered in different embodiments to correspond to any set of rules capable of being applied to a managed resource to manage the activation of various instances of the managed resource that are resident on different nodes of a distributed computer system.

Figure 1:
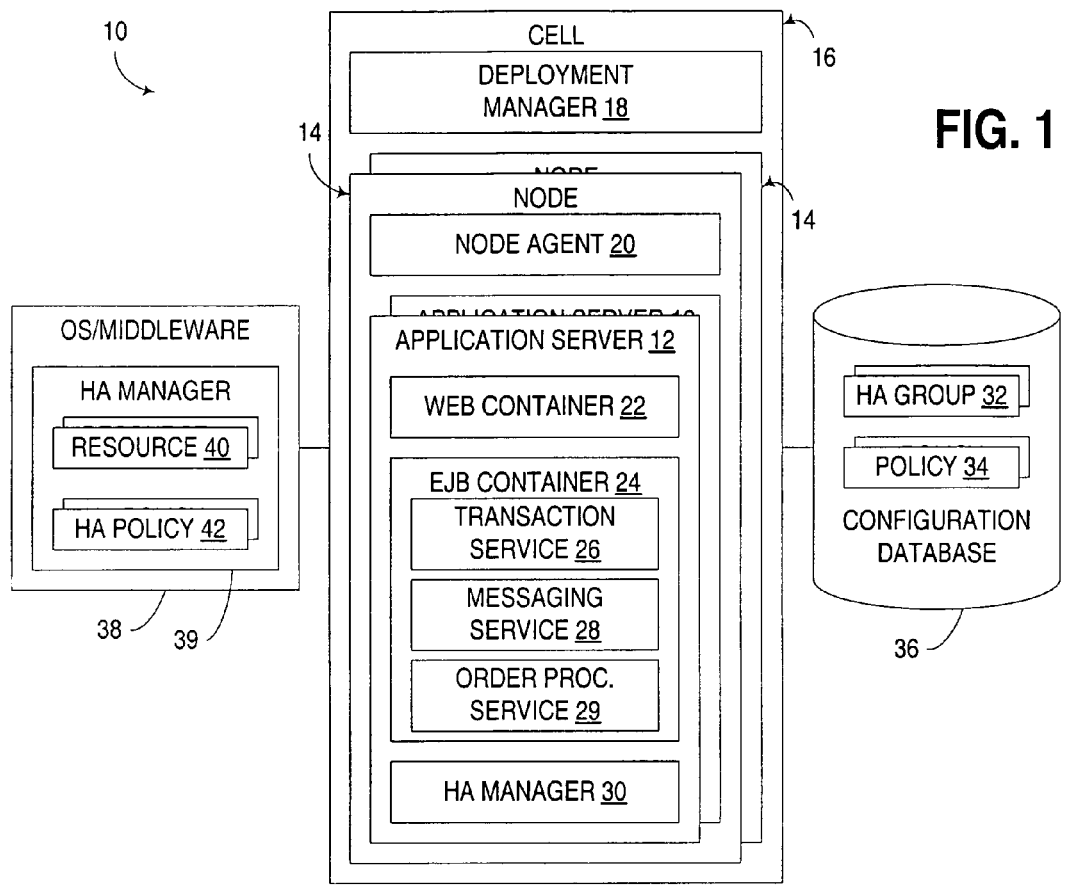
FIG. 1 is a block diagram of a distributed computing system incorporating a policy-based resource management system consistent with the invention.

Turning to the Drawings, wherein like numbers denote like parts throughout the several views, FIG. 1 illustrates an exemplary distributed computing system 10 suitable for implementing a policy-based resource management system consistent with the invention. FIG. 1, in particular, illustrates a distributed computing system incorporating a WebSphere-based application server architecture developed by International Business Machines Corporation, the assignee of the instant application. In this architecture, a set of application servers 12 are logically arranged into a plurality of nodes 14, which are further logically arranged into one or more cells 16. A node 14 typically resides on a single physical computer, although multiple nodes may reside on the same physical computer. Furthermore, a cell 16 is a logically construct that groups together all application servers 12 managed by the same deployment manager 18, which communicates with node agents 20, resident on each node, for performing administrative tasks on each node.

Each application server 12 represents a process resident on a node and used to execute one or more applications, e.g., as may be installed within various containers such as a web container 22 and an Enterprise Java Bean (EJB) container 24. Moreover, the applications hosted by each application server 12 may be clustered to provide clustered services with load balancing and/or failover capabilities.

By way of example, FIG. 1 illustrates a transaction service 26, a messaging service 28, and a order processing service 29 resident in EJB container 24. Services 26, 28 represent singleton services, which are typically active in only one application server at a time, while order processing service 29 represents a distributed service, which may be active in multiple application servers at the same time, e.g., to balance workload received from multiple clients. Load balancing is typically utilized only for order processing service 29, while failover is typically desirable for all of services 26, 28 and 29.

In the illustrated embodiment, each service 26, 28 and 29 represents a managed resource in distrusted computer system 10. One manner in which each such resource is managed is through the use of an activation or high availability policy. Specifically, as illustrated in FIG. 1, each application server 12 may incorporate a high availability manager 30, itself a distributed service, which is used to manage one or more high availability groups 32 using one or more high availability or activation policies 34.

Groups 32 and policies 34 are typically persisted in a configuration database 36 accessible to each node 14 in a cell 12. Database 36, or portions thereof, may be replicated on each node 14 in some embodiments.

Each group 32 logically represents a collection of application instances, or members, resident in one or more application servers 12, and collectively providing a service. In this context, each group 32 defines the membership of application instances for a resource being managed by the high availability manager service. As such, typically a group 32 will be defined for each of example services 26, 28 and 29.

Each policy 34, in term, is used to define the activation policy for one or more associated groups 32. Specifically, a policy 34 defines how many and which individual instances of a service will be activated at any given time. In addition, each policy defines how failover is accomplished whenever an active member fails, as well as whether failback is supported whenever a member becomes available.

For example, a policy 34 may define a number of different policy types, e.g., an all active policy (where all members are active at the same time), an M of N policy (where a maximum of M of N members are active at the same time), a one of N policy (where only one member is active at a given time), a no operation policy (for policies that are not directly managed by the high availability manager service 30), and a static policy (where a singleton service is permitted to execute on only one specific member, and failover is not supported).

Furthermore, for certain policies, it may be desirable to provide additional policy configuration parameters in a policy 34. For example, it may be desirable to provide an ordered list of preferred servers that is used to prioritize members. It may also be desirable to limit activation to only those members residing on preferred servers. It may also be desirable to provide a fail back indication that controls whether a service will be moved back to a more preferred server when one becomes available.

An additional parameter that may be supplied in a policy is an indication of one or more externally-managed resources upon which a resource managed by a policy 34 is dependent. Specifically, in the illustrated embodiment, other resources in distributed computer system 10 are externally from the application server architecture defined within each cell 16. These resources may be managed, for example, in an underlying operating system or middleware product, e.g., as illustrated at 38, and administered by a high availability manager 39 resident therein using resource objects 40 and high availability policies 42. The resource objects 40 may represent, for example, resources such as network storage devices such as SAN disks, file systems, direct access storage devices (DASD's), and database servers, as well as management services therefor and/or entities used thereby, e.g., network addresses, communication ports, hardware adapters, etc.

In the illustrated embodiment, a managed resource that is dependent upon an externally-managed resource is managed by a policy in part through the use of a parameter in the policy 34 therefor that identifies the resource dependency. As an example, a transaction service such as transaction service 26 may be dependent upon a Journal File System (JFS) on a SAN disk to store transaction logs used by the transaction service. While a SAN disk may be shared by multiple nodes, only one node may be permitted to mount a JFS file system at a time, and as a result, it may be necessary for the transaction service to be collocated on the same node as the JFS file system. Accordingly, the transaction service would be considered to be dependent upon the JFS file system resource, and as such, the policy 34 that applies to the transaction service desirably includes an indication that the policy is dependent upon an externally-managed resource (the JFS file system). The mechanism by which resource dependencies are managed in a manner consistent with the invention is discussed in greater detail below.

Various types of middleware or operating system managers may be used for high availability manager 39, e.g., the HACMP manager available from International Business Machines Corporation, among others. Moreover, the types of externally-managed resources upon which a policy 34 may be dependent may vary in different embodiments.

In the illustrated embodiment, groups 32 and policies 34 are associated with one another via match criteria based upon sets of attributes associated with each group and each policy. In particular, each group 32 is required to match with a single policy 34 such that one policy is used to manage the activation of members in a group. However, each policy 34 may be associated with multiple groups 32. The manner in which groups and policies are associated with one another in a manner consistent with the invention is discussed in the aforementioned cross-referenced Newport application.

Figure 2:
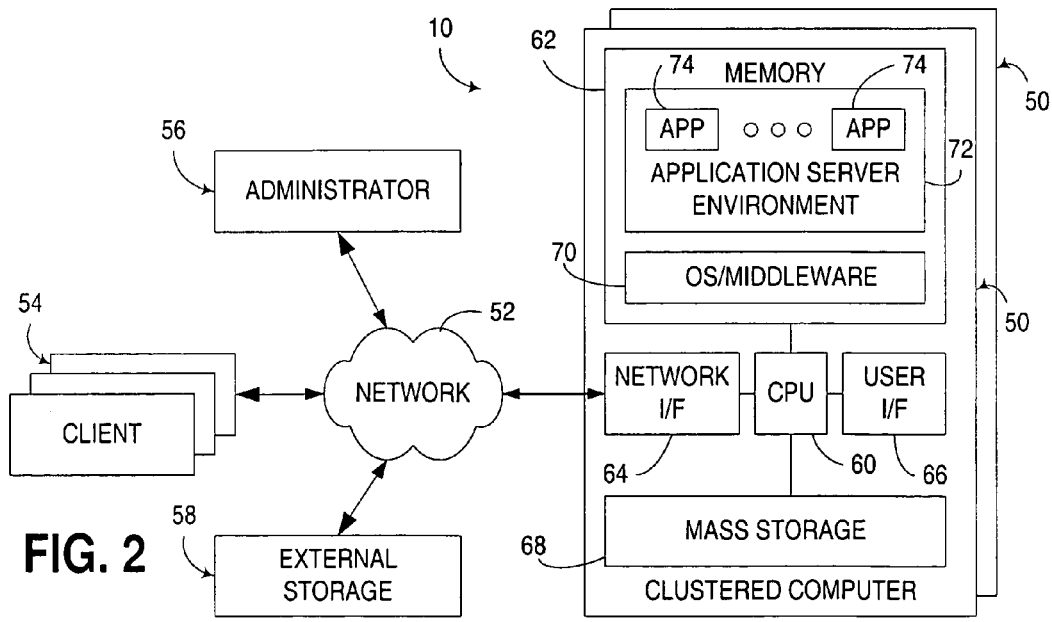
FIG. 2 is a block diagram of an exemplary hardware implementation of the distributed computing system of FIG. 1.

The manner in which distributed computer system 10 may be implemented in hardware may vary in different implementations. For example, FIG. 2 illustrates on exemplary implementation of system 10, incorporating a plurality of clustered computers 50 interfaced with one another via a network 52. As will be appreciated in the art, network 52 may be implemented using any combination of LAN's, WAN's, point-to-point interconnects, and/or various other networking topologies. Furthermore, network 52 may represent multiple distinct networks in some embodiments. Computers 50 may be located in close geographical proximity with one another, or may be geographically dispersed.

Also illustrated as coupled to network 52 are a plurality of client computers 54, which may be connected to clustered computers 50 via private and/or public networks such as the Internet to perform tasks using the application server architecture described herein. For administration purposes, one or more administrator computers 56 may also be coupled to network 52. In addition, it will be appreciated that various other types of components may be coupled to network 52, e.g., external storage 58 such as a storage area network, network addressed storage, or various other persistent storage systems known in the art.

Each computer 50 generically represents, for example, any of a number of multi-user computers such as a network server, a midrange computer, a mainframe computer, etc. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like).

Each computer 50 generally includes a central processing unit (CPU) 60 including one or more system processors and coupled to a memory or main storage 62, typically through one or more levels of cache memory (not shown). Furthermore, CPU 60 may be coupled to additional peripheral components, e.g., one or more networks 52 via a network interface 64, various input/output devices (e.g., a control panel, display, keyboard, mouse and/or dedicated workstation, etc.) via a user interface 66, and mass storage 68 (e.g., a DASD or one or more disk drives). Any number of alternate computer architectures may be used in the alternative.

Each computer 50 is further configured to host a number of levels of software suitable for implementing a distributed computer environment. Shown resident in memory 62 is operating system and/or middleware program code 70, as well as application server environment program code 72, e.g., the aforementioned WebSphere-based architecture, within which reside one or more applications 74.

The discussion hereinafter will focus on the specific routines utilized to implement the above-described policy management functionality. The routines executed to implement the embodiments of the invention, whether implemented as part of an operating system or a specific application, component, program, object, module or sequence of instructions, will also be referred to herein as "computer program code," or simply "program code." The computer program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Figure 3:
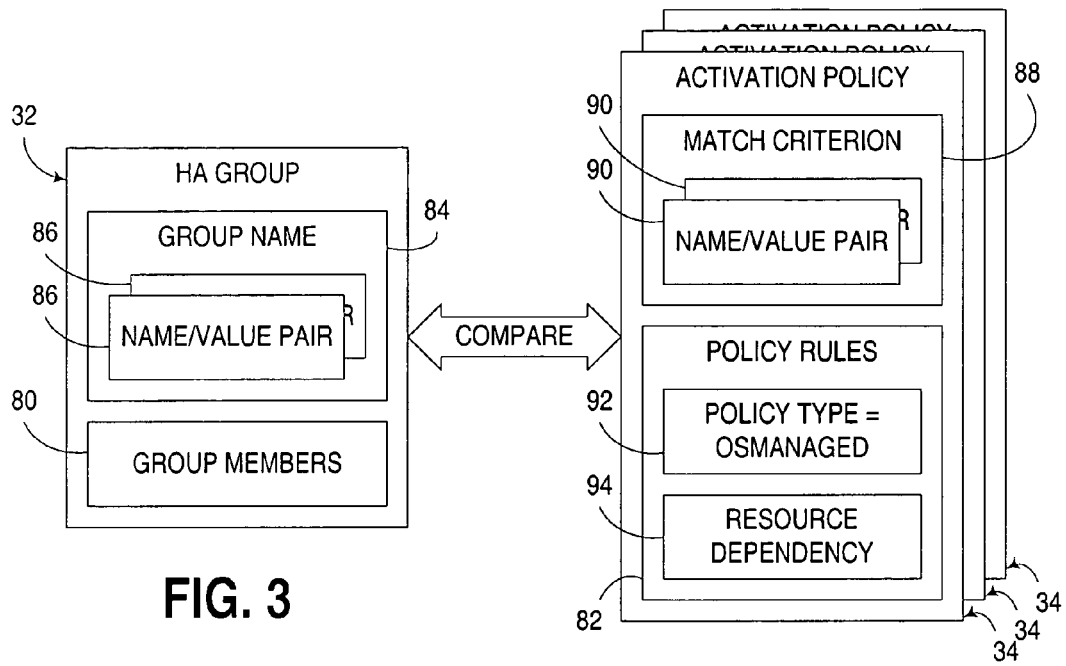
FIG. 3 is a block diagram of exemplary high availability group and activation policy data structures for use in the distributed computing system of FIG. 1.

Now turning to FIG. 3, exemplary data structure implementations of each high availability group 32 and activation policy 34 are illustrated. In the illustrated embodiments, each group 32 and activation policy 34 is implemented as an object, incorporating both data associated with the respective entity, as well as one or more methods suitable for performing actions on such entities.

As noted above, each group 32 represents a managed resource such as a cluster service. In this regard, each group 32 includes, in the least, a list of group members 80, representing the individual instances of the managed resource that are resident in the system. Other information may also be maintained in each group 32, such as the activation/deactivation status of each member, a list of nodes upon which such members are resident and/or the status of each node, communication settings, description information, etc.

Likewise, each policy 34 includes one or more policy rules 82 that define the parameters of the policy, including, as noted above, information such as the type of policy, a list of preferred servers, a fail back indication, and any externally-managed resources for which dependencies exist. Each policy 34 is configured to operate such that when given the set of current online servers that are candidates for hosting a managed resource, as well as the set of servers that were previously in this membership but are now unresponsive, the policy is able to ascertain whether the state (Active/Idle) associated with each server meets the policy definition, and if not, selectively activate or deactivate one or more instances of the managed resource to comply with the policy definition.

Each group 32 also includes a group name 84 that includes a set of name/value pairs 86, and that serves to uniquely identify the group. For example, the group name 84 may be implemented in a similar manner to the X.500 naming protocol. Likewise, each policy includes a match criterion (or match set) 88 that includes a set of name/value pairs 90, and that is used to match the policy with one or more groups. By utilizing multiple name/value pairs, policies may be defined in a flexible and scalable manner to apply to multiple managed resources, thereby substantially simplifying policy administration. Further details regarding the matching of policies with managed resources may be found in the aforementioned cross-referenced Newport application.

The manner in which a policy may be applied to a managed resource may vary in different embodiments. In the illustrated embodiment, a policy is given the set of current online servers that are members of the high availability group. If some servers were previously a member of the group and failed then this set is also provided. A policy is applied by the high availability manager whenever the set of members for a resource group changes (e.g., a member joins/leaves the group or a member fails) or the state associated with a member changes (e.g., active/idle/disabled). The policy accepts these parameters as well as a callback interface which allows the policy to tell the high availability manager that a member should be activated or deactivated. When the high availability manager sees a member change state then it invokes the policy to enforce itself on the set of members in the group. If a member is disabled then the policy excludes it from it's set of candidates for activate/deactivate events.

To support resources that are dependent upon other, externally-managed resources, the policy rules for those policies that apply to such dependent resources typically are assigned a "policy type", illustrated at 92, that indicates that management of the resource is dependent upon status information provided by an external resource manager. In the illustrated embodiment, for example, a no operation (e.g., an "OSManaged") policy type is used to make such an indication. In addition, the policy rules include a resource dependency identifier 94 that identifies the externally-managed resource upon which any resource managed by the policy depends.

To apply a policy associated with a resource dependency, high availability manager 30 desirably includes an API that allows an external entity such as high availability manager 39 to indicate that an externally-managed resource is currently activated on a specific node, which then triggers high availability manager 30 to activate all resources with an OSManaged policy that name that externally-managed resource as a dependency. Among other benefits, this enables a "hot" standby approach to be implemented (if desired) for any services managed by an application server, which due to hardware topology have a dependency such that they can only be activated when collocated with externally-managed resources. In many instances, recovery is reduced from several minutes to at the most a few seconds, thus dramatically reducing the downtime associated with managing resources incorporating such resource dependencies.

Figure 4:
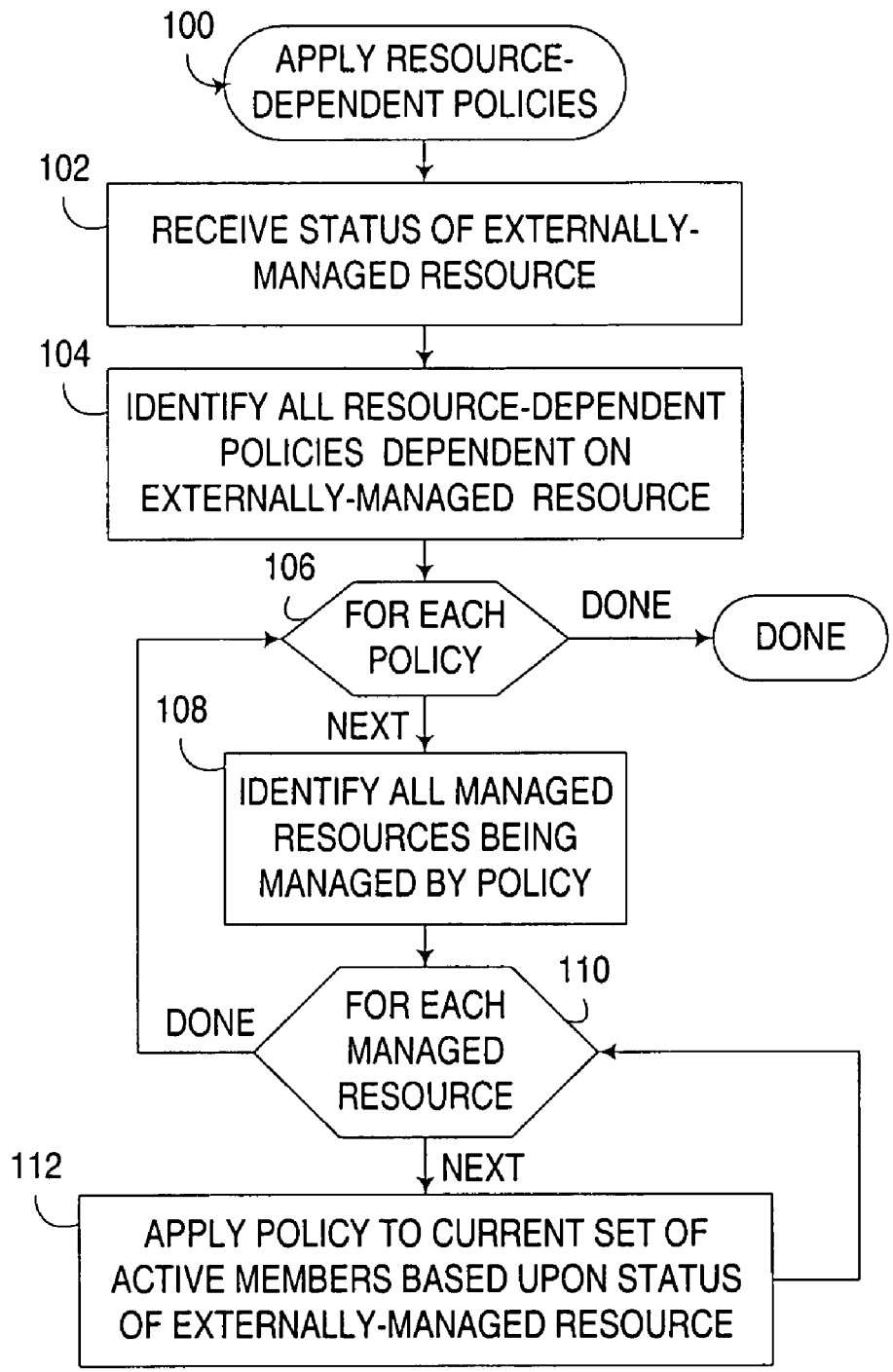
FIG. 4 is a flowchart illustrating an apply resource-dependent policies routine implemented in the high availability manager referenced in FIG. 1.

As one example of the application of a resource-dependent activation policy in distributed computer system 10, FIG. 4 illustrates an apply resource dependent policies routine 100, which may be executed, for example, by each node in a distributed computer environment to locally apply an activation policy to managed resources having resource dependencies in a manner consistent with the invention. Routine 100 may be initiated, for example, in response to an event generated by an external entity such as an OS/middleware high availability manager and received by an application server-based high availability manager indicating the status of an externally-managed resource.

Routine 100 begins in block 102 by receiving the status of the externally-managed resource, e.g., via one or more parameters supplied by the event that initiated routine 100. Next, block 104 identifies all resource-dependent policies that are dependent upon the externally-managed resource, e.g., by searching through the available policies for policies having a type of "OSManaged" where the resource dependency identifier identifies the specified externally-managed resource.

Next, block 106 initiates a FOR loop to process through the identified policies. Specifically, for each such policy, block 106 passes control to block 108 to identify all managed resources being managed by the policy, e.g., based upon attribute set matching as described above. Control then passes to block 110 to initiate a FOR loop to process each managed resource, whereby for each such managed resource, block 112 is executed to apply the policy to the current set of active members (or instances) of the managed resource based upon the status of the externally-managed resource, e.g., to ensure that the managed resource is collocated with the externally-managed resource. Control then returns to block 110 to process additional managed resources (if any). In addition, once all managed resources for a policy have been processed, block 110 passes control to block 106 to process any additional identified policies (if any). Once all identified policies have been processed, routine 100 is complete.

It may also be desirable in some embodiments to support additional types of interactions between high availability managers. For example, it may be desirable to additionally provide an API in high availability manager 30 to allow high availability manager 39 to inquire about the health of all managed resources that have policies dependent upon an externally-managed resource. This health check may be used to mark particular managed resources as failed in the externally high availability manager when appropriate.

Figure 5:
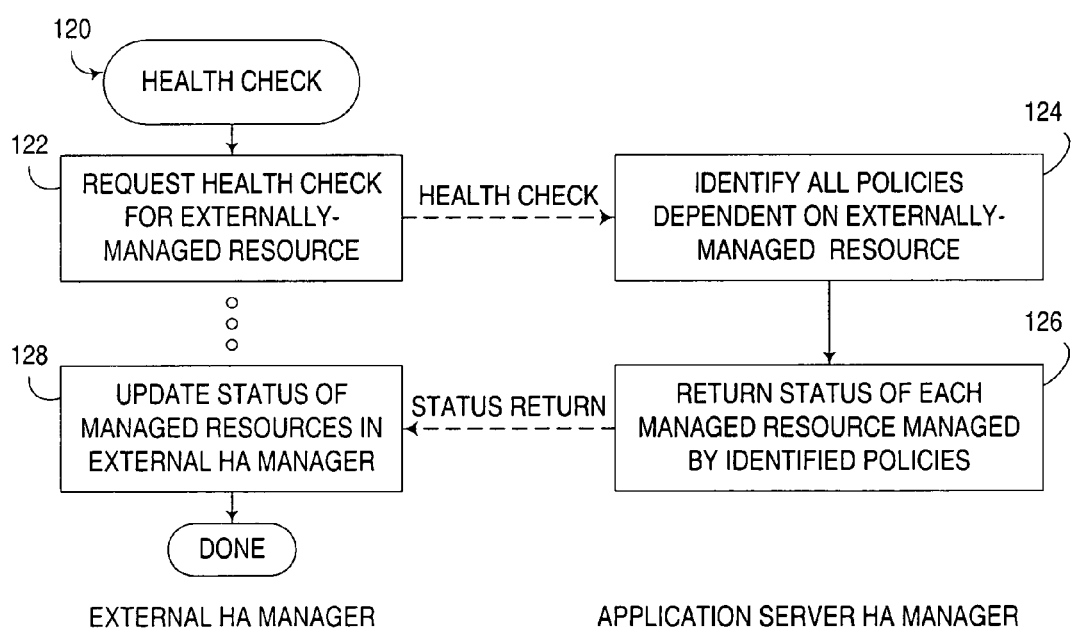
FIG. 5 is a flowchart illustrating a health check routine implemented by the external and application server high availability managers referenced in FIG. 1.

As an example, FIG. 5 illustrates a health check routine 120 that may be initiated by an external high availability manager to determine the status of any resources managed by an application server high availability manager. Routine 120 begins in block 122 with a health check request being made by the external high availability manager, e.g., via an API call or event issued to the application server high availability manager. Upon receipt of the request by the application server high availability manager in block 124, all policies that are dependent upon the externally-managed resource are identified, in a similar manner to block 104 of FIG. 4. Next, in block 126, the application server high availability manager returns to the external high availability manager the status of each managed resource being managed by the identified policies, and in block 128, the status of such managed resources in the external high availability manager is updated based upon the returned status information from the application server high availability manager. Routine 120 is then complete.

It will be appreciated that various modifications may be made to the illustrated embodiments without departing from the spirit and scope of the invention. For example, resource dependency policies may be matched with managed resources using functionality other than the aforementioned attribute set matching functionality.

Other modifications will be apparent to one of ordinary skill in the art. Therefore, the invention lies in the claims hereinafter appended.

What is claimed is:

1. A method of applying an activation policy to a managed resource in a distributed computer environment, the method comprising:

in a first resource manager that manages the managed resource, receiving status information associated with an externally-managed resource that is managed externally to the first resource manager by a second resource manager implemented at a different level of software in the distributed computer environment from the first resource manager, wherein the activation policy is associated with the externally-managed resource and is configured to make activation decisions about the managed resource based upon a status of the externally-managed resource; and in the first resource manager, applying the activation policy to the managed resource using the status information;

wherein the distributed computer environment includes a plurality of computers, wherein the managed resource includes a resource instance resident on each of the plurality of computers, wherein the status information identifies a computer among the plurality of computers upon which the externally-managed resource is active, and wherein the activation policy is configured to activate a single instance of the managed resource that is collocated on the same computer as the externally-managed resource.

2. The method of claim 1, wherein the status information comprises location information identifying upon which among a plurality of computers in the distributed computer environment the externally-managed resource is active.

3. The method of claim 1, wherein the first resource manager comprises a first high availability manager, and wherein the second resource manager comprises a second high availability manager.

4. The method of claim 3, wherein the first high availability manager is integrated into one of an application server and a database server, and wherein the second high availability manager is integrated into one of an operating system and middleware.

5. The method of claim 3, further comprising, with the first high availability manager, providing status information regarding the managed resource in response to a request from the second high availability manager.

6. The method of claim 5, further comprising updating a status of the managed resource in the second high availability manager in response to the status information provided by the first high availability manager.

7. The method of claim 1, wherein receiving the status information comprises processing an event generated in response to a change in status for the externally-managed resource.

8. The method of claim 1, wherein the managed resource is selected from the group consisting of a transaction service, a messaging service, a clustered service, an application server process, and combinations thereof, and wherein the externally-managed resource is selected from the group consisting of a database, a file system, a storage device, and combinations thereof.

9. The method of claim 1, wherein the policy identifies the externally-managed resource.

10. A method of applying an activation policy to a clustered service in a distributed computer environment of the type including an application server architecture including a plurality of application servers resident on a plurality of nodes, the application server architecture including a first high availability manager configured to manage a plurality of clustered services in the application server architecture, the distributed computer environment further including a second high availability manager external to the application server architecture and configured to manage a plurality of externally-managed resources, the method comprising, in the first high availability manager:
   receiving from the second high availability manager status information associated with an externally-managed resource from among the plurality of externally-managed resources, wherein the activation policy is associated with the externally-managed resource and is configured to make activation decisions about a clustered service from among the plurality of clustered services based upon a status of the externally-managed resource; and
   applying the activation policy to the clustered service using the received status information associated with the externally-managed resource;
   wherein the distributed computer environment includes a plurality of computers, wherein the clustered service includes a resource instance resident on each of the plurality of computers, wherein the status information identifies a computer among the plurality of computers upon which the externally-managed resource is active, and wherein the activation policy is configured to activate a single instance of the clustered service that is collocated on the same computer as the externally-managed resource.

11. An apparatus, comprising:
   at least one hardware-based processor; and
   a first resource manager configured to be executed by the at least one hardware-based processor to perform a method of applying an activation policy to a managed resource in a distributed computer environment, the method comprising:
   receiving status information associated with an externally-managed resource that is managed externally to the first resource manager by a second resource manager implemented at a different level of software in the distributed computer environment from the first resource manager, wherein the activation policy is associated with the externally-managed resource and is configured to make activation decisions about the managed resource based upon a status of the externally-managed resource; and
   applying the activation policy to the managed resource using the status information;
   wherein the distributed computer environment includes a plurality of computers, wherein the managed resource includes a resource instance resident on each of the plurality of computers, wherein the status information identifies a computer among the plurality of computers upon which the externally-managed resource is active, and wherein the activation policy is configured to activate a single instance of the managed resource that is collocated on the same computer as the externally-managed resource.

12. The apparatus of claim 11, wherein the status information comprises location information identifying upon which among a plurality of computers in the distributed computer environment the externally-managed resource is active.

13. The apparatus of claim 11, wherein the first resource manager comprises a first high availability manager, and wherein the second resource manager comprises a second high availability manager.

14. The apparatus of claim 13, wherein the first high availability manager is integrated into one of an application server and a database server, and wherein the second high availability manager is integrated into one of an operating system and middleware.

15. The apparatus of claim 13, wherein the first high availability manager is configured to provide status information regarding the managed resource in response to a request from the second high availability manager.

16. The apparatus of claim 15, wherein the second high availability manager is configured to update a status of the managed resource in response to the status information provided by the first high availability manager.

17. The apparatus of claim 11, wherein the first high availability manager is configured to process an event generated in response to a change in status for the externally-managed resource.

18. The apparatus of claim 11, wherein the managed resource is selected from the group consisting of a transaction service, a messaging service, a clustered service, an application server process, and combinations thereof, and wherein the externally-managed resource is selected from the group consisting of a database, a file system, a storage device, and combinations thereof.

19. The apparatus of claim 11, wherein the policy identifies the externally-managed resource.

20. A program product, comprising:
   a computer readable recordable type medium; and
   program code for a first resource manager stored on the computer readable recordable type medium and configured upon execution to perform a method of applying an activation policy to a managed resource in a distributed computer environment, the method comprising:
   receiving status information associated with an externally-managed resource that is managed externally to the first resource manager by a second resource manager implemented at a different level of software in the distributed computer environment from the first resource manager, wherein the activation policy is associated with the externally-managed resource and is configured to make activation decisions about the managed resource based upon a status of the externally-managed resource; and
   applying the activation policy to the managed resource using the status information;
   wherein the distributed computer environment includes a plurality of computers, wherein the managed resource includes a resource instance resident on each of the plurality of computers, wherein the status information identifies a computer among the plurality of computers upon which the externally-managed resource is active, and wherein the activation policy is configured to activate a single instance of the managed resource that is collocated on the same computer as the externally-managed resource.

* * * * *

UNITED STATES PATENT AND TRADEMARK OFFICE
CERTIFICATE OF CORRECTION

PATENT NO.      : 7,657,536 B2                                   Page 1 of 1
APPLICATION NO. : 11/068262
DATED           : February 2, 2010
INVENTOR(S)     : William T. Newport It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1342 days.

Signed and Sealed this

Thirtieth Day of November, 2010

David J. Kappos
*Director of the United States Patent and Trademark Office*